US009279972B2

(12) United States Patent
Judkewitz et al.

(10) Patent No.: US 9,279,972 B2
(45) Date of Patent: Mar. 8, 2016

(54) SPATIAL FREQUENCY SWEPT INTERFERENCE ILLUMINATION

(71) Applicant: California Institute of Technology, Pasadena, CA (US)

(72) Inventors: Benjamin Judkewitz, Los Angeles, CA (US); Changhuei Yang, Alhambra, CA (US)

(73) Assignee: California Institute of Technology, Pasadena, CA (US)

( * ) Notice: Subject to any disclaimer, the term of this patent is extended or adjusted under 35 U.S.C. 154(b) by 150 days.

(21) Appl. No.: 14/068,818

(22) Filed: Oct. 31, 2013

(65) Prior Publication Data

US 2014/0139840 A1    May 22, 2014

Related U.S. Application Data

(60) Provisional application No. 61/721,345, filed on Nov. 1, 2012.

(51) Int. Cl.
| | |
|---|---|
| *G02B 5/18* | (2006.01) |
| *G02B 21/00* | (2006.01) |
| *G02B 21/36* | (2006.01) |
| *G02B 27/58* | (2006.01) |

(52) U.S. Cl.
CPC ........ *G02B 21/0056* (2013.01); *G02B 21/0076* (2013.01); *G02B 21/367* (2013.01); *G02B 27/58* (2013.01); *G02B 5/1828* (2013.01)

(58) Field of Classification Search
None
See application file for complete search history.

(56) References Cited

U.S. PATENT DOCUMENTS

| | | | | |
|---|---|---|---|---|
| 5,801,881 A | * | 9/1998 | Lanni | G02B 21/06 359/368 |
| 6,314,210 B1 | * | 11/2001 | Fukushima | G02B 27/46 359/559 |
| 6,819,415 B2 | * | 11/2004 | Gerstner | G02B 21/06 250/237 G |
| 7,339,738 B1 | * | 3/2008 | Carr | G02B 26/0808 359/291 |
| 2009/0180932 A1 | * | 7/2009 | Angeley | G01N 21/4788 422/82.05 |

OTHER PUBLICATIONS

Bailey, B., Farkas, D. L., Taylor, D. L. and Lanni, F., "Enhancement of axial resolution in fluoresence microscopy by standing-wave excitation," Nature 366, pp. 44-48 (1993).
Cathey, W. T. and Dowski, E. R., "New paradigm for imaging systems," Appl Opt 41, pp. 6080-6092 (2002).
Dodt, H.-U. et al., "Ultramicroscopy: three-dimensional visualization of neuronal networks in the whole mouse brain," Nat Meth 4, pp. 331-336 (2007).
Dowski, E. R. and Cathey, W. T., "Extended depth of field through wave-front coding," Appl Opt 34, pp. 1859-1866 (1995).
Fahrbach, F. O. and Rohrbach, A., "Propagation stability of self-reconstructing Bessel beams enables contrast-enhanced imaging in thick media," Nat Commun 3, p. 632 (2012).
Fahrbach, F.O., Simon, P. & Rohrback, A., "Microscopy with self-reconstruction beams, Mature Photonics", NPHOTON, pp. 780-785 (2010).

(Continued)

*Primary Examiner* — Arnel C Lavarias
(74) *Attorney, Agent, or Firm* — Sheila Martinez-Lemke; Weaver Austin Villeneuve & Sampson LLP

(57) ABSTRACT

Spatial frequency swept interference (SFSI) illumination and imaging methods and devices that interfere two collimated coherent beams to generate an interference pattern of a plurality of illuminating sheets with sweeping spatial frequency.

11 Claims, 15 Drawing Sheets

(56) References Cited

OTHER PUBLICATIONS

Feldkhun, D. and Wagner, K.H., "Doppler encoded excitation pattern tomographic optical microscopy", Optical Society of America, Applied Optics, vol. 49, No. 34, pp. H47-H63 (Dec. 2010).
Fercher, A. F., Hitzenberger, C. K., Kamp, G. and El-Zaiat, S. Y., "Measurement of intraocular distances by backscattering spectral interferometry," Optics Communications 117, pp. 43-48 (1995).
Gao, L. et al., "Noninvasive imaging beyond the diffraction limit of 3D dynamics in thickly fluorescent specimens," Cell 151, pp. 1370-1385 (2012).
Geissbuehler, M., Lasser, T. and Leitgeb, R.A., "k-Microscopy—resolution beyond the diffraction limit", Labratoire d'Optique Biomedicale, Ecole Polythechnique Federale de Lausanne, CH-1015 Lausanne, Switzerland; Center of Biomedical Engineering and Physics, Medical University of Vienna, A-10-1090 Vienna, Austria, 5 pages (2008).
Herman, R. M. and Wiggins, T. A., "Production and uses of diffractionless beams," JOSA A 8, pp. 932-942 (1991).
Huisken, J. and Stainier, D. Y. R. "Even fluorescence excitation by multidirectional selective plane illumination microscopy (mSPIM)," Opt Lett 32, pp. 2608-2610 (2007).
Huisken, J. and Stainier, D. Y. R., "Selective plane illumination microscopy techniques in developmental biology," Development 136, pp. 1963-1975 (2009).
Huisken, J., Swoger, J., del Bene, F., Wittbrodt, J. and Stelzer, E. H. K., "Optical sectioning deep inside live embryos by selective plane illumination microscopy," Science 305, pp. 1007-1009 (2004).
Keller, P. I., Schmidt, A.D., Santella, A., Kharry, K., Bao, Z., Wittbrook, I. & Stetzer, E.H.K., "Fast, high-contrast imaging of animal development with scanned light sheet-based structured-illumination miscroscopy", Nature Methods, pp. 637-642 (2010).
Keller, P. J., Schmidt, A. D., Wittbrodt, J. and Stelzer, E. H. K., "Reconstruction of zebrafish early embryonic development by scanned light sheet microscopy," Science 322, pp. 1065-1069 (2008).
Krzic, U., Gunther, S., Saunders, T. E., Streichan, S. J. and Hufnagel, L., "Multiview light-sheet microscope for rapid in toto imaging," Nat Meth (2012).
Levoy, M., Ng, R., Adams, A., Footer, M. and Horowitz, M. "Light field microscopy,"Acm T Graphic 25, pp. 924-934 (2006).
Mertz, J., "Optical sectioning microscopy with planar or structured illumination," Nat Meth 8, 811-819 (2011).
Palero, J., Santos, S. I. C. O., Artigas, D. and Loza-Alvarez, P. A, "Simple scanless two photon fluorescence microscope using selective plane illumination," Opt Express 18, pp. 8491-8498 (2010).
Planchon, T. A. et al., "Rapid three-dimensional isotropic imaging of living cells using Bessel beam plane illumination," Nat Meth 8, pp. 417-423 (2011).
Siedentopf, H. and Zsigmondy, R., "Über Sichtbarmachung und Größenbestimmung ultramikoskopischer Teilchen, mit besonderer Anwendung auf Goldrubingläser," Annalen der Physik 315, pp. 1-39 (1902).
Tomer, R., Khairy, K., Amat, F. and Keller, P. J., "Quantitative high-speed imaging of entire developing embryos with simultaneous multiview light-sheet microscopy," Nat Meth (2012).
Truong, T. V., Supatto, W., Koos, D. S., Choi, J. M. and Fraser, S. E., "Deep and fast live imaging with two-photon scanned light-sheet microscopy," Nat Meth 8, pp. 757-760 (2011).
Wojtkowski, M., Leitgeb, R., Kowalczyk, A., Bajraszewski, T. and Fercher, A. F., "In vivo human retinal imaging by Fourier domain optical coherence tomography," J Biomed Opt 7, p. 457 (2002).
Choma, M., Sarunic, M., Yang, C. And Izatt, J., "Sensitivity advantage of swept source and Fourier domain optical coherence tomography," Opt Express 11, pp. 2183-2189 (2003).

\* cited by examiner

*Epifluorescence Illumination*

*Sheet Illumination*

-- Prior Art --

-- *Prior Art* --

US 9,279,972 B2

SPATIAL FREQUENCY SWEPT INTERFERENCE ILLUMINATION

CROSS-REFERENCES TO RELATED APPLICATIONS

This is a non-provisional application of, and claims priority to, U.S. Provisional Patent Application No. 61/721,345, titled "Spatial Frequency Swept Interference Illumination," filed on Nov. 1, 2012. This provisional application is hereby incorporated by reference in its entirety for all purposes.

STATEMENT AS TO RIGHTS OF INVENTIONS MADE UNDER FEDERALLY SPONSORED RESEARCH OR DEVELOPMENT

This invention was made with government support under OD007307 awarded by the National Institutes of Health. The government has certain rights in the invention.

FIELD

Embodiments of the present disclosure generally pertain to three-dimensional (3D) imaging. More specifically, certain embodiments pertain to spatial frequency swept interference (SFSI) illumination methods, SFSI illumination devices, 3D imaging methods using SFSI illumination (SFSI 3D imaging methods), and 3D imaging devices using SFSI illumination (SFSI 3D imaging devices).

BACKGROUND

In biomedicine, 3D fluorescence imaging with high lateral and axial resolution inside extended biological samples is desired. Conventional spatial sampling techniques such as epi-fluorescence, point scanning and sheet microscopy face inherent limiting trade-offs between spatial resolution, field-of-view, photodamage, and recording speed.

FIG. 1A is schematic drawing of epi-fluorescence illumination used in a conventional epi-fluorescence microscope. Conventional epi-fluorescence microscopy suffers from poor axial resolution (i.e. resolution in z-direction), and out-of-focus fluorescence.

Conventional selective plane illumination microscopy (SPIM) scans a thin sheet of laser light across a sample as shown in FIG. 1B. Due to the laws of diffraction and Gaussian beam propagation, conventional SPIM is limited by a tradeoff between sheet thickness (which affects axial resolution of the sample in the z-direction) and lateral extent (which affects lateral field of view: $FOV_x$) as described by the graph shown in FIG. 1C. Moreover, SPIM suffers from prominent image artifacts such as striping and shadowing. Some examples of conventional SPIM can be found in Siedentopf, H. and Zsigmondy, R., "Über Sichtbarmachung and Größenbestimmung ultramikoskopischer Teilchen, mit besonderer Anwendung auf Goldrubingläser," *Annalen der Physik* 315, pp. 1-39 (1902), Huisken, J., Swoger, J., del Bene, F., Wittbrodt, J. and Stelzer, E. H. K., "Optical sectioning deep inside live embryos by selective plane illumination microscopy," *Science* 305, pp. 1007-1009 (2004), Dodt, H.-U. et al., "Ultramicroscopy: three-dimensional visualization of neuronal networks in the whole mouse brain," *Nat Meth* 4, pp. 331-336 (2007), Keller, P. J., Schmidt, A. D., Wittbrodt, J. and Stelzer, E. H. K., "Reconstruction of zebrafish early embryonic development by scanned light sheet microscopy," *Science* 322, pp. 1065-1069 (2008), Huisken, J. and Stainier, D. Y. R., "Selective plane illumination microscopy techniques in developmental biology," *Development* 136, pp. 1963-1975 (2009), Mertz, J., "Optical sectioning microscopy with planar or structured illumination," *Nat Meth* 8, 811-819 (2011), Palero, J., Santos, S. I. C. O., Artigas, D. and Loza-Alvarez, P. A, "Simple scanless two photon fluorescence microscope using selective plane illumination," *Opt Express* 18, pp. 8491-8498 (2010), Truong, T. V., Supatto, W., Koos, D. S., Choi, J. M. and Fraser, S. E., "Deep and fast live imaging with two-photon scanned light-sheet microscopy," *Nat Meth* 8, pp. 757-760 (2011), Huisken, J. and Stainier, D. Y. R., "Even fluorescence excitation by multidirectional selective plane illumination microscopy (mSPIM)," *Opt Lett* 32, pp. 2608-2610 (2007), Krzic, U., Gunther, S., Saunders, T. E., Streichan, S. J. and Hufnagel, L., "Multiview light-sheet microscope for rapid in toto imaging," *Nat Meth* (2012), Tomer, R., Khairy, K., Amat, F. and Keller, P. J., "Quantitative high-speed imaging of entire developing embryos with simultaneous multiview light-sheet microscopy," *Nat Meth* (2012), which are hereby incorporated by reference in their entirety.

With imaging techniques that use non-diffracting self-healing Bessel beams, much of the optical power resides in side lobes of the beam, which can result in excitation of unwanted out-of-focus photons. These side lobes present an inherent trade-off of photodamage (e.g., photobleaching) that may result from this unwanted excitation, which in turn limits the useful extent of the Bessel beam illumination. Bessel beam based sheet microscopy has thus far only been demonstrated for short sheet lengths of a few tens of µm, resulting in small fields-of-view unless images are tiled at the expense of increased sample illumination and recording time. Some examples of conventional Bessel beam imaging can be found in Herman, R. M. and Wiggins, T. A., "Production and uses of diffractionless beams," *JOSA A* 8, pp. 932-942 (1991), Fahrbach, F. O. and Rohrbach, A., "Propagation stability of self-reconstructing Bessel beams enables contrast-enhanced imaging in thick media," *Nat Commun* 3, p. 632 (2012), Fahrbach, F. O., Simon, P. and Rohrbach, A., "Microscopy with self-reconstructing beams," *Nature Photonics* 4, pp. 780-785 (2010), Planchon, T. A. et al., "Rapid three-dimensional isotropic imaging of living cells using Bessel beam plane illumination," *Nat Meth* 8, pp. 417-423 (2011), Gao, L. et al., "Noninvasive imaging beyond the diffraction limit of 3D dynamics in thickly fluorescent specimens," *Cell* 151, pp. 1370-1385 (2012), which are hereby incorporated by reference in their entirety.

Conventional standing-wave fluorescence imaging (SWFI) can provide wide-field fluorescence imaging by interfering two laser beams and generating a high frequency standing wave patterns as discussed in Bailey, B., Farkas, D. L., Taylor, D. L. and Lanni, F., "Enhancement of axial resolution in fluorescence microscopy by standing-wave excitation," *Nature* 366, pp. 44-48 (1993), which is hereby incorporated by reference in its entirety. However, due to ambiguity along the axial dimension, SWFI is only suitable for very thin samples with sub-µm features and not suitable for thick biological tissues.

BRIEF SUMMARY OF THE INVENTION

Embodiments of the present disclosure provide SFSI illumination methods, SFSI illumination devices, SFSI 3D imaging methods, and SFSI 3D imaging devices used in applications such as, for example, biomedical research and medical diagnosis.

In certain embodiment, an SFSI illumination device generates collimated coherent beams that intersect to generate an interference pattern of multiple illumination sheets with sweeping spatial frequency. The multiple illumination sheets illuminate a sample at multiple axial planes simultaneously. The axial sample profile is encoded in the spatial Fourier space.

One embodiment is directed to a spatial frequency swept interference illumination device with a spatial light modulator for displaying two interlaced diffraction patterns, and an optical system for transforming the displayed interlaced diffraction patterns (e.g., blazed gratings) into a plurality of illumination sheets with sweeping spatial frequency. In some cases, the optical system transforms the displayed interlaced diffraction patterns into two intersecting collimated coherent beams providing an interference pattern comprising the plurality of illumination sheets with varying spatial frequency. The spatial light modulator may also modify a relative phase of the intersecting collimated coherent beams.

Another embodiment is directed to a spatial frequency swept interference illumination 3D imaging device comprising a spatial frequency swept interference illumination device that generates a plurality of illumination sheets with sweeping spatial frequency. The spatial frequency swept interference illumination 3D imaging device also comprises a light detector that detects light from a sample illuminated by the plurality of illumination sheets and a processor that generates a 3D image of the sample based on the detected light. In some cases, the processor generates the 3D image by Fourier-transforming the detected light for discrete spatial frequencies associated with different axial positions.

Another embodiment is directed to a method of spatial frequency swept interference illumination. This method includes sweeps spatial frequency of a plurality of illumination sheets. The illumination sheets are the result of an interference pattern generated by two intersecting collimated coherent beams. The method also changes a relative phase of the two intersecting collimated coherent beams to two or more different phases. In some cases, the method may also capture frames of a sample illuminated by the plurality of illumination sheets at different relative phases, generate 3D complex dataset based on the captured frames based on different relative phases, and reverse Fourier transform the 3D complex dataset into a spatial domain to generate a 3D image of the sample.

These and other embodiments of the invention are described in further detail below.

DETAILED DESCRIPTION OF THE INVENTION

Embodiments of the present invention will be described below with reference to the accompanying drawings.

Figure 1A:
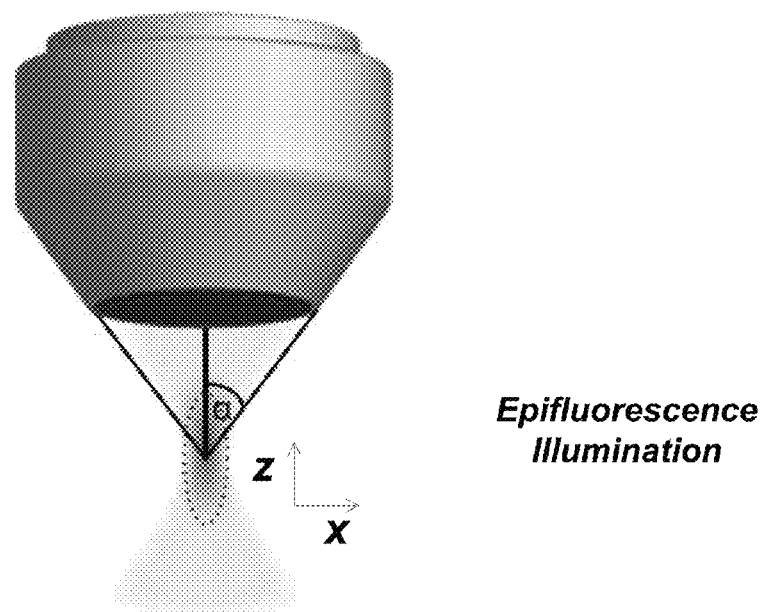
FIG. 1A is a schematic diagram of an example of epi-fluorescence illumination used in conventional epi-fluorescence imaging.
Figure 1B:
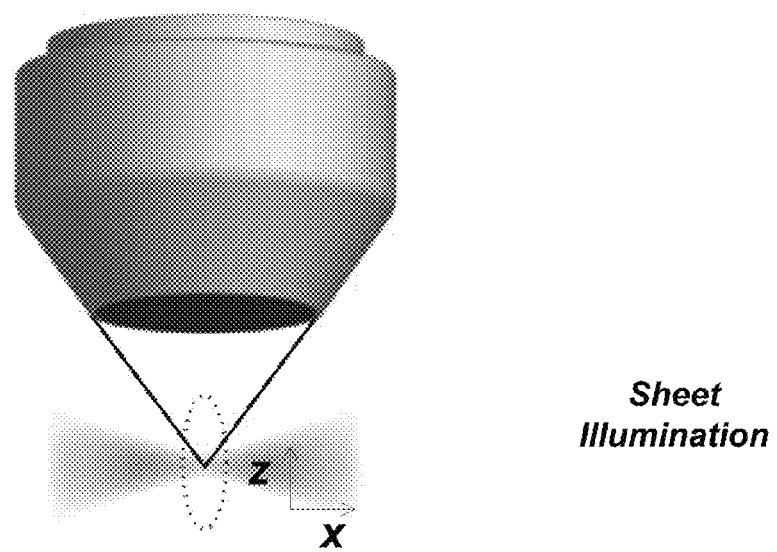
FIG. 1B is a schematic diagram of an example of conventional sheet illumination used in conventional SPIM.
Figure 1C:
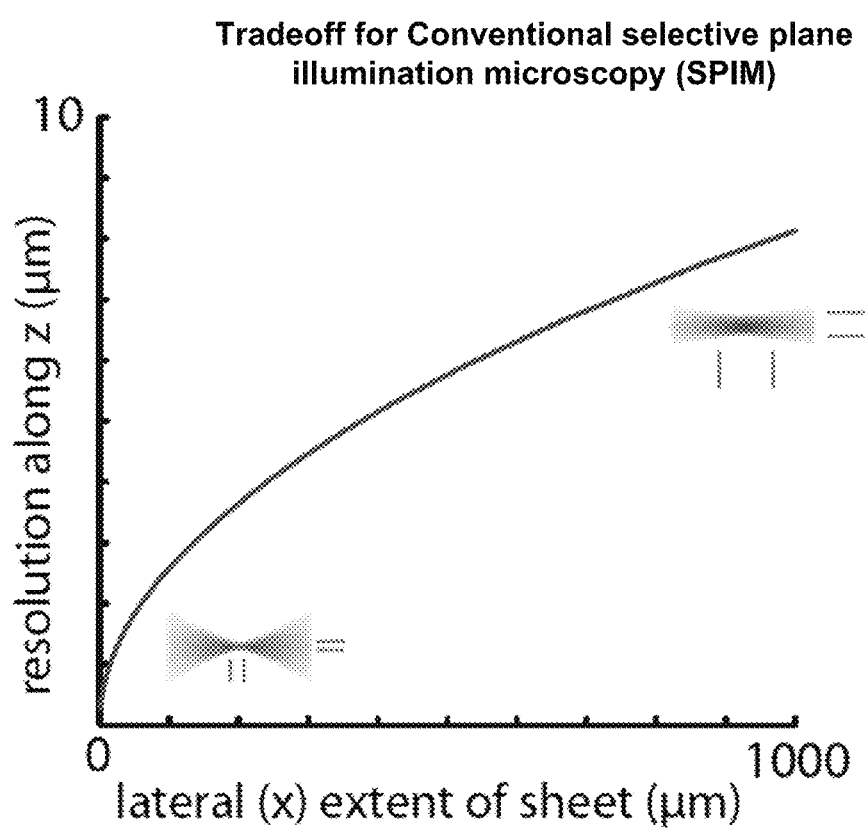
FIG. 1C is a graph showing the trade-off between sheet thickness and extent in conventional SPIM.
Figure 2A:
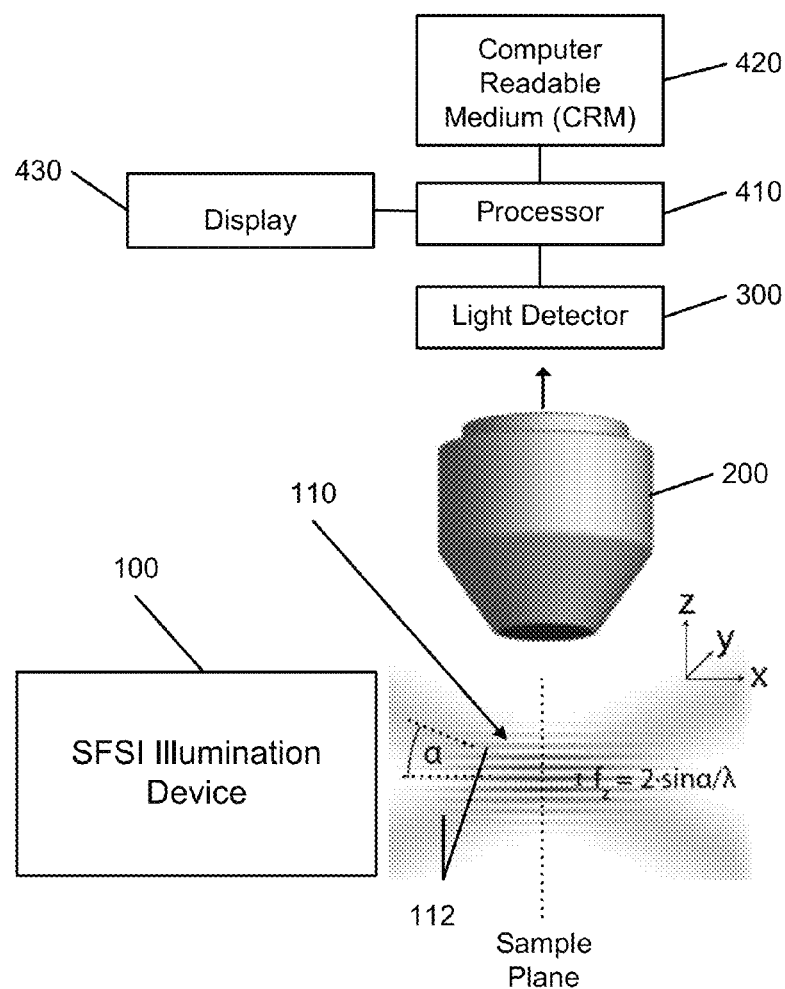
FIG. 2A is a schematic illustration of an SFSI 3D imaging device in operation, according to embodiments of the invention.

FIG. 2A is a schematic drawing of components of an SFSI 3D imaging device 10 in operation, according to embodiments of the invention. The SFSI 3D imaging device 10 includes an x-axis, a y-axis, and a z-axis. The SFSI 3D imaging device 10 can acquire a 3D image of a sample at or near a sample plane based on illumination from a plurality of parallel illumination sheets 110 with varying spatial frequency, which illuminate the sample at multiple z-planes simultaneously. The plurality of illumination sheets 110 is provided by an interference pattern of two intersecting collimated coherent beams 112. The interference pattern may extend over the entire intersection volume of the intersecting beams 112. This intersection volume can be as much as several cubic millimeters in certain cases. The two collimated coherent beams 112 intersect at various angles α to generate a sinusoidal illumination profile (in z-direction) with varying spatial frequencies according to $f_z = 2 \cdot \sin \alpha / \lambda$. According to this equation, the spacing between illumination sheets 110 can be varied based on angle. For example, according to this equation and depending on the angle α, the spacing between illumination sheets 110 can be made smaller than the wavelength.

The SFSI 3D imaging device 10 comprises an SFSI illumination device 100 providing the plurality of illumination sheets 110, detection optics 200, and a light detector 300 (e.g., a CCD camera) that records data from light passed by the detection optics 200. The detection optics 200 are located in a lateral position (along the z-axis) away from the plurality of illumination sheets 110. The sample can be imaged from this lateral position using detection optics 200. In certain cases, the detection optics 200 may be similar to a conventional microscope optics including an objective and a tube lens. The SFSI 3D imaging device 10 also comprises a processor 410 (e.g., microprocessor), a computer readable medium (CRM)

420, and a display 430 that can display output from the SFSI 3D imaging device 10. The processor 410 is in electronic communication with the light detector 300 to receive a signal with light data from the light detector 300. The processor 410 is in electronic communication with the CRM 420 (e.g., memory) to store and retrieve information. The display 430 is in electronic communication with the processor 410 to receive a signal with the 3D image and other output for displaying. As used herein, electronic communication can refer to communication in either wired or wireless form.

The SFSI 3D imaging device 10 comprises an SFSI illumination device 100 that can provide illumination sheets 110 with varying spatial frequency. An SFSI illumination device 100 can refer to one or more devices that can vary the spatial frequency and phase of the illumination sheets 110 by changing the angle α and relative phase φ of the intersecting collimated coherent beams 112. The spatial frequency is changed by changing the angle α. The spatial frequency of the illumination planes 110 is swept or otherwise varied to avoid ambiguous depth information from the multiple illumination sheets 110. The spatial frequency may be varied from low to high, from high to low, or other suitable variation. Sweeping or otherwise varying the spatial frequency of the illumination sheets 110 can uniquely encode the light data recorded by the light detector 300 in the spatial frequency domain. The processor 410 can then apply Fourier transform to the recorded light data for different spatial frequencies to directly obtain a Z-stack (i.e. multiple images at various depths along z-axis) to generate the 3D image of the sample. As used herein, axial can refer to a direction substantially orthogonal to the parallel illumination sheets 110. In FIG. 2A, axial is a direction parallel to the z-axis.

For each spatial frequency f (in z/axial direction) and phase φ, the 3D illumination pattern P can be described as:

$$P_{f,\phi}(x,y,z) = \cos(2\pi f z + \phi) \quad \text{(Eqn. 1)}$$

where f and z are Fourier-conjugate variables

The image $I_{f,\phi}$ recorded at the light detector 200 (in the x-y plane) corresponds to the multiplication of the illumination pattern with the 3D sample S, integrated along z, which is described as:

$$I_{f,\phi} = \int_{FOV_z} P_{f,\phi}(x,y,z) \cdot S(x,y,z) dz \quad \text{(Eqn. 2)}$$

To encode the sample (recorded data) in the Fourier-domain, the spatial frequencies are displayed in discrete intervals Δf from zero to a maximum frequency $f_{max}$ (i.e. f=0, Δf, 2Δf, 3Δf, ..., $f_{max}$), according to Δf=1/h, where h is the demagnified height of the SLM display at the sample plane. That is, the spatial frequencies are displayed in intervals of f=0, 1/h, 2/h, 3/h, ..., $f_{max}$ where h is the demagnified height of the SLM display at the sample plane. Each spatial frequency f is displayed three times at phases φ=0, π/2, π to yield a complex-valued dataset:

$$C(x, y, f) = (\bar{I}_{f,0} - \bar{I}_{f,\pi}) + i(2\bar{I}_{f,\frac{\pi}{2}} - \bar{I}_{f,0} + \bar{I}_{f,\pi}) \quad \text{(Eqn. 3)}$$

Other phases can be used. This 3D complex dataset is back-transformed into the spatial domain by discrete Fourier transform (DFT), yielding the reconstructed 3D sample function:

$$S'(x,y,z') = \sum_{f=-f_{max}}^{f_{max}} C(x, y, f) e^{i2\pi f z} \quad \text{(Eqn. 4)}$$

In operation, the SFSI illumination device 100 varies spatial frequency of the plurality of illumination sheets 110 by changing angle α and relative phase φ of the intersecting collimated coherent beams 112. The detection optics 200 pass light to the light detector 300, which records light data (frames) at different spatial frequencies and phases. The processor 410 receives a signal with light data from the light detector 300. The processor 410 Fourier transforms the light data to determine images at various depths through the sample based on the light data to determine a 3D image of the sample.

Figure 2B:
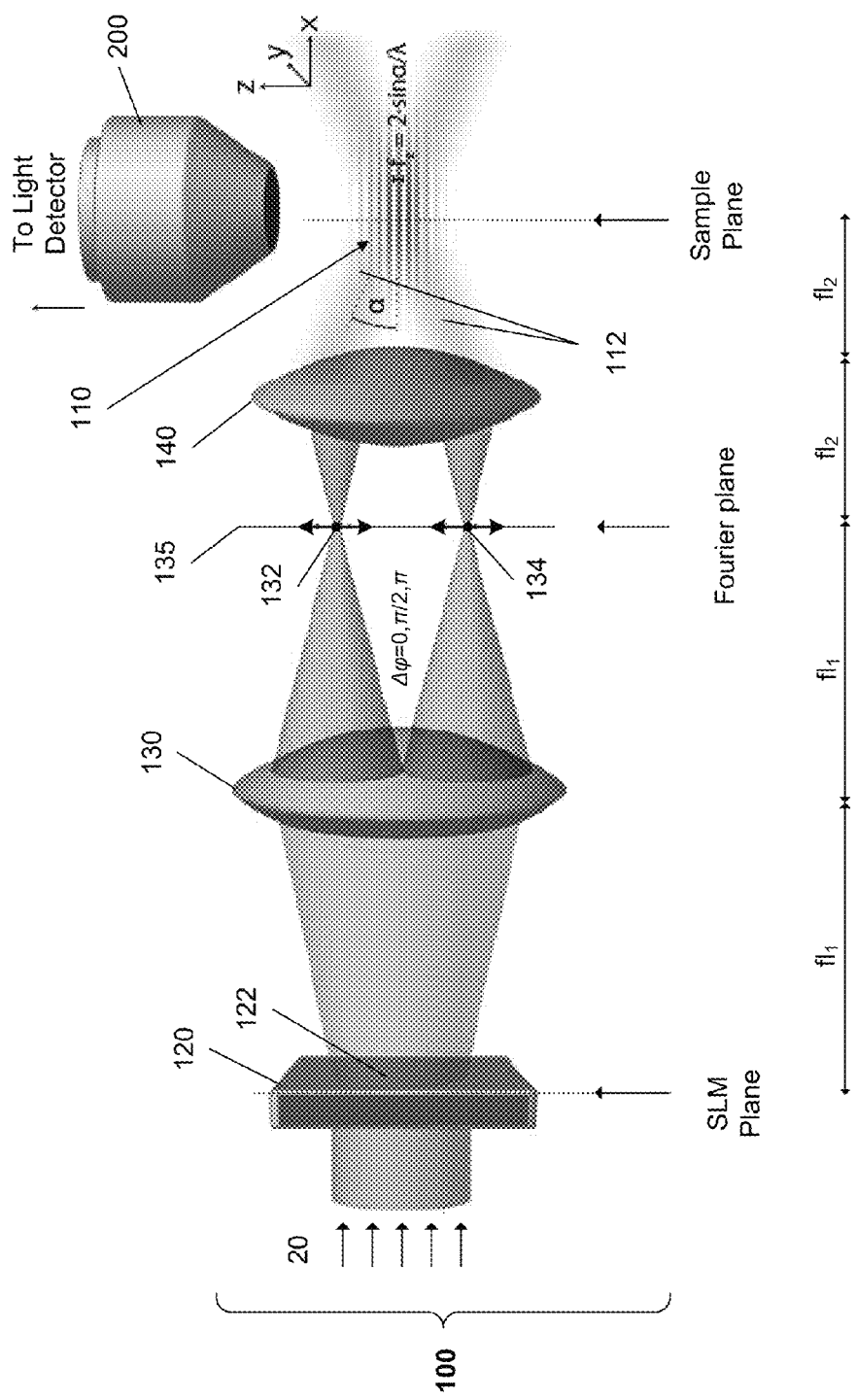
FIG. 2B is a schematic drawing illustrating an SFSI illumination device and detection optics, according to embodiments.

FIG. 2B is a schematic drawing illustrating an SFSI illumination device 100 and detection optics 200, according to embodiments. The SFSI illumination device 100 comprises an x-axis, a y-axis, and a z-axis. The SFSI illumination device 100 also comprises a spatial light modulator (SLM) 120, and an optical assembly with a first lens 130 and a second lens 140, arranged along an x-direction parallel to the x-axis. A first moving spot 132 and a second moving spot 134 are projected by the SLM 120 into a Fourier plane of the first lens 130, which is also a Fourier plane of the second lens 140. The SFSI illumination device 100 also comprises a plate 135 with a slit aperture at the Fourier plane to reject the zero-order diffraction pattern of the SLM 120. The second lens 140 can back transform (i.e. inverse Fourier transform) the moving points 132 and 134 into the nondiffracting pattern of the plurality of illumination sheets 110 with varying spatial frequency. The detection optics 200 are located in a lateral position (along the z-axis) away from the interference pattern at the intersection of the collimated coherent beams 112. The SFSI illumination device 100 can vary spatial frequency of the plurality of illumination sheets 110 by changing the angle α and relative phase φ of the intersecting collimated coherent beams 112.

An SLM 120 can refer to a device that uses an externally-supplied electrical or optical signal to modulate phase, φ, and/or amplitude of light waves. In certain embodiments, the SLM 120 modulates the phase, φ, between m different phases. In an exemplary embodiment, the SLM 120 modulates phase, φ, between three (m=3) different phases, φ, such as, for example, between the three phases:

$$\varphi = 0, \frac{\pi}{2}, \pi.$$

In FIG. 2B, collimated light 20 is directed to the SLM 120. In certain cases, the collimated light 20 is spatially filtered, collimated light (e.g., 532 nm laser light). Collimated light 20 may be provided by a collimated light source such as a laser (e.g. Excelsior® 532 SM). The collimated light source may be a component of the SFSI illumination device 100 or may be a separate component.

The SLM 120 comprises a programmable SLM display at an SLM plane. In FIG. 2B, the SLM plane is at a surface of the SLM 120 facing the first lens 130. The SLM 120 displays two interlaced diffraction patterns 122 at the SLM plane of the SLM display. The interlaced diffraction patterns 122 can diffract light into separate beams in different directions based on the periodic spacing and wavelength. A suitable example of a diffraction pattern 122 is a blazed grating. In certain embodiments, the SLM display is a reflective display such as a reflective liquid-crystal on silicon (LCoS) display. In other embodiments, the SLM display may be a transmissive display such as a transmissive liquid-crystal display (LCD). Suitable devices that can be used as an SLM 120 are commercially available. An example of such a suitable device is the reflective HOLOEYE® SLM, Pluto, phase only LCoS, 8 μm pixel size, 1080×1920 pixels display. The SLM refresh rate may be any suitable rate. In one embodiment, a suitable refresh rate is in the range of 30 per second to 100 per second.

In certain embodiments, the SLM display is in the form of a two-dimensional matrix of elements (pixels) at the SLM plane. The two-dimensional matrix has dimensions of $Pix_1 \times Pix_2$, where $Pix_1$ is the number of pixels in a first direction and $Pix_2$ is the number of pixels in a second direction orthogonal to the first direction. In some examples, the SLM display is a 1920-by-1080 pixel display where $Pix_1$ is 1920 and $Pix_2$ is 1080. In some cases, the SLM display may be oriented so that second direction is generally in the vertical direction.

In FIG. 2B, the SLM plane is imaged onto the sample plane via an optical assembly comprising the first lens 130 having a focal length of $fl_1$ and the second lens 140 having a focal length of $fl_2$, in a demagnification 4-f optical setup. In the illustrated demagnification 4-f optical setup, the second lens 140 is located at a distance in the x-direction equal to the first focal length $fl_1$ added to the second focal length of $fl_2$, and the first lens 130 is located away from the SLM 120 by the first focal length $fl_1$. Although a 20× demagnification setup is shown, other demagnification values in the range of 1× to 100× can be used. Alternatively, the optical assembly may be a magnification optical setup with magnification values in the range of 1× to 100×.

Using the optical assembly in FIG. 2B, the SLM 120 projects two moving spots, a first spot 132 and a second spot 134, into a Fourier plane of the first lens 130, which is also a Fourier plane of the second lens 140 facing the sample. The SLM 120 displays two interlaced diffraction patterns 122 (one for each of the two spots 132 and 134 projected into the Fourier plane) at the SLM plane. In certain cases, the two spots 132 and 134 are projected into the Fourier plane (of the first lens 130 and the second lens 140) by dividing the SLM display into vertical (z-directional) stripes and interlacing two diffraction gratings 122 by displaying them on every other vertical stripe. The vertical stripes can be of any suitable width. In one case, the vertical stripes are 6 pixel-wide stripes. This arrangement of interlaced diffraction gratings 122 enables independent control by the SLM 120 of the position, and relative phase, of the two spots 132 and 134.

In FIG. 2B, the SFSI illumination device 100 also comprises a plate 135 with a slit aperture placed into the Fourier plane to reject the zero-order diffraction pattern of the SLM 120. The slit aperture is aligned in the z-direction to restrict illumination to an x-z plane.

In FIG. 2B, the second lens 140 can back transform (i.e. inverse Fourier transform) the moving points 132 and 134 into the nondiffracting grating of the plurality of illumination sheets 110 with varying spatial frequency. The two intersecting collimated coherent beams 112 generating plane waves at varying angles α result in an interference pattern of varying spatial frequency at the sample plane. This optical assembly enables the SLM 120 to have independent control of the position of the two spots 132 and 134, and thus control the angle α of the two intersecting collimated coherent beams 112. By controlling the position of the moving points 132 and 134, the SLM 120 can sweep or otherwise vary the spatial frequency of the plurality of illumination sheets 110. By generating multiple illumination sheets 110, multiple z-planes of the sample can be illuminated simultaneously.

In certain cases, the SLM 120 sweeps or otherwise varies the spatial frequency of the illumination sheets 110 from low to high (or alternatively from high to low) by changing the angle α and the relative phase φ of the intersecting collimated coherent beams 112. The SLM 120 varies the angle α by moving the position of the first spot 132 and the second spot 134. The spatial frequency of the illumination sheets 110 is swept/varied to avoid ambiguous depth information from multiple illumination sheets 110. That is, sweeping or otherwise varying the spatial frequency can uniquely encode the axial position of the sample light data in the Fourier domain. By Fourier-transforming light data recorded for the different spatial frequencies, a Z-stack of the sample can be directly obtained to generate the 3D image of the sample.

In certain embodiments, the axial position of the light data is frequency encoded by selecting a particular pattern for the interlaced diffraction patterns 122 displayed on the SLM 120. In these cases, the two interlaced diffraction patterns 122 displayed on the SLM 120 may be determined according to the piecewise function:

$$\phi_{SLM}(p_y,p_z)=2\pi \cdot f/2 \cdot p_y/Pix_2 \text{ for } p_y \bmod 12<6;$$

$$\phi_{SLM}(p_y,p_z)=-2\pi \cdot f/2 \cdot p_y/Pix_2+\phi \text{ otherwise} \qquad (\text{Eqn. 5})$$

Where:

$Pix_2$ is the number of pixels in the SLM display in the vertical direction $p_y$ is the horizontal pixel coordinate of the SLM display $p_z$ is the vertical pixel coordinate SLM display Based on x-axis, y-axis and z-axis established in FIG. 2B Using Eqn. 5, different diffraction patterns 122 can be determined for n discrete frequencies. Using interlaced diffraction patterns 122, n discrete frequencies can be displayed on the SLM 120 (which are demagnified via the 4-f system) resulting in the display of 0 to n−1 vertical periods at the sample plane. For example, 109 discrete frequencies (n=109) can be displayed at the SLM 120 (demagnified by 20× by a 4-f system) resulting in the display of 0-108 vertical periods at the sample. At the SLM 120, the maximum vertical period corresponds to $$\frac{Pix_z}{n-1},$$

where $Pix_z$ is the number of vertical SLM pixels in the SLM display and n−1 is the number of vertical periods displayed. For example, with a 1080×1920 SLM display, the $Pix_z$=1080 SLM pixels. If 109 discrete frequencies are displayed (n=109), resulting in 108 vertical periods, then the maximum vertical period is:

$$\frac{1080 \; SLM \; \text{pixels}}{108} = 10 \; SLM \; \text{pixels}.$$

At the sample (which was demagnified via the 4-f system), the smallest vertical period (corresponding to the highest frequency) at the sample is:

$$\frac{Pix_z}{n-1} \cdot \frac{\text{SLM pixel size}}{\text{Demagnification Factor}}.$$

According to the above example, and assuming a 8 μm pixel size and 20× demagnification, the smallest vertical period at the sample is:

$$\frac{1080 \text{ SLM pixels}}{108} \cdot \frac{8 \text{ μm}}{20} = 4 \text{ μm}.$$

In certain embodiments, the SFSI illumination device 100 includes a slit aperture placed at the Fourier plane to reject the zero-order diffraction pattern of the SLM 120. For example, FIG. 2B includes a plate 135 having a slit aperture at the Fourier plane of the first lens 130, which is also the Fourier plane of the second lens 140 facing the sample plane. The slit aperture can be any suitable width such as a width ranging from 5-10 microns. In certain cases, a constant tilt may be applied to the SLM display to be able to reject the zero order diffraction pattern by the slit aperture.

A light detector 300 can refer to device that generates a signal with light data associated with properties of light received. For example, the signal(s) may be in the form of electrical current from the photoelectric effect. The light detector 300 may measure light properties such as, for example, intensity of the light, the wavelength(s) of the light, the frequency or frequencies of the light, the polarization(s) of the light, the phase(s) of the light, and/or the spin angular momentum(s) of the light. In some cases, the light detector 300 may continuously capture time-varying light data during illumination of the sample. In other cases, the light detector 300 may capture snapshot data at multiple sample times. In some embodiments, the light detector 300 may be in the form of a one-dimensional or a two-dimensional array of light detecting elements (e.g., pixels). Some examples of light detectors 120 having one-dimensional or two-dimensional arrays include a charge coupled device (CCD) array, a complementary metal-oxide-semiconductor (CMOS) array, an avalanche photo-diode (APD) array, a photo-diode (PD) array, a photomultiplier tubes (PMT) array, etc. These examples and other are commercially available. In certain embodiments, the light detector 300 is a charge coupled device (CCD) camera. An example of a suitable CCD camera that can be used is a GX1920, Allied Vision Technologies®.

In certain embodiments, the light detector 300 records light data at the n discrete spatial frequencies displayed at each of the m phase shifts, and thus m×n frames of light data are recorded during an imaging process. In the example with 109 discrete frequencies and 3 phase shifts $$\Delta \varphi = 0, \frac{\pi}{2}, \pi$$

(i.e. m=3 and n=109), the light detector 300 records 3×109 frames. To encode the light data in the Fourier domain, the n discrete spatial frequencies are displayed in evenly spaced intervals Δf from zero to the maximum frequency $f_{max}$ (i.e. f=0, Δf, 2Δf, 3Δf, . . . , $f_{max}$), according to Δf=1/h, where h is the demagnified height of the SLM display as imaged onto the sample plane. Using the m×n frames (e.g., 3×109 frames where m=3 and n=109) recorded by the light detector 300, a complex-valued dataset C(x,y,f) can be determined based on Eqn. 3. This complex-valued dataset C(x,y,f) may be zero-padded with an additional n−1 frames (e.g., 108 frames where n−1=108), made conjugate symmetric along f (by mirroring and conjugating the dataset along the zero frequency) and Fourier-transformed with an FFT algorithm. In one embodiment, the dataset may be multiplied with a Gaussian along f (FWHM=2·$f_{max}$) before Fourier-transforming, which may increase the impulse-response FWHM. In one case, the impulse-response FWHM increased from 2.4 μm to 2.8 μm by multiplying the dataset with a Gaussian along f (FWHM=2·$f_{max}$) before Fourier-transforming.

In certain embodiments, the SFSI 3D imaging device 10 may be used for fluorescence imaging (fluorescence imaging embodiments). In fluorescence imaging, a reagent (e.g., fluorescence/phosphorescence dye) is mixed with the sample to mark or tag portions of the objects of interest with fluorophore. A fluorophore refers to a component of a molecule that causes the molecule to fluoresce or phosphoresce once excited. The fluorophore can absorb energy from excitation light of a specific wavelength(s) and re-emit the energy at a different wavelength(s). For example, the sample may be irradiated with blue excitation light to activate fluorophore in the sample, which releases fluorescence/phosphorescence red emissions. In fluorescence imaging embodiments, the plurality of illumination sheets 110 may provide excitation light of certain wavelength(s) that can activate fluorophore in the sample to emit light of another wavelength(s) (i.e. emissions).

The SFSI 3D imaging device 10 comprises detection optics 200. In certain embodiments, the detection optics 200 may include an objective and a tube lens of a conventional microscope (i.e. a microscope objective). In fluorescence imaging embodiments, the SFSI imaging device 10 includes an emissions filter between the sample being irradiated and the light detector 300 to reject excitation light and pass fluorescence/phosphorescence emissions to the light detector 300. Suitable emission filters (e.g., Semrock® 582/75) are commercially available. In an example where the detection optics 200 includes a tube lens and an objective lens, an emission filter may be located between the tube lens and the objective lens. In one exemplary embodiment, the detection optics 200 is in an infinity corrected microscope setup consisting of a microscope objective, an emission filter (e.g. Semrock® 582/75), a 200 mm tube lens and a CCD camera (e.g., GX1920, Allied Vision Technologies®). In fluorescence imaging embodiments, the signal(s) generated by the light detector 300 includes emissions data, which is light data associated with emissions from fluorophores activated in an object being illuminated.

In certain embodiments, such as the one shown in FIG. 2B, the SFSI illumination device 100 includes a demagnification 4-f optical assembly having a first lens 130 and a second lens 140, where the first lens 130 has a focal length of fl$_1$ and the second lens 140 has a focal length of fl$_2$. In certain cases, the second lens 140 is located at a distance in the x-direction equal to the first focal length fl$_1$ added to the second focal length of fl$_2$, and the first lens 130 is located away from the object plane (in FIG. 2B, the SLM plane) by the first focal length fl$_1$. In certain cases, the first lens 130 and the second lens 140 may be achromatic lenses. In one example, the first lens 130 is a 500 mm achromatic lens and the second lens is a 25 mm achromatic lens. The demagnification factor of the demagnification 4-f optical assembly may be of various values ranging from 1× to 100×. In FIG. 2B, the demagnification factor is about 20×. In another embodiment, a suitable demagnification factor may be in the range of 1× to 500×. Although a demagnification 4-f optical assembly is used, a magnification 4-f optical assembly can be used in other embodiments. In the magnification setups a suitable magnification factor may be in the range of 1× to 500×.

In certain embodiments, the sample may include one or more objects (e.g., cells) being imaged.

The processor 410 (e.g., microprocessor) may execute instructions stored on the CRM 420 to perform one or more functions of the SFSI 3D imaging device 10. For example, the processor 410 may execute instructions to perform one or more steps of the SFSI 3D imaging method. As another example, the processor 419 may execute instructions stored on the CRM 220 to perform one or more other functions of the SFSI illumination device 100. As another example, the processor 210 may execute instructions stored on the CRM 220 to perform one or more other functions of the SFSI 3D imaging device 10.

The CRM (e.g., memory) 420 can store instructions for performing some of the functions of the SFSI 3D imaging device 10. The instructions are executable by the processor 410 or other processing components of the SFSI 3D imaging device 10. The CRM 420 can also store the 3D images, and other data produced by the SFSI 3D imaging device 10.

The SFSI 3D imaging device 10 also includes a display 430 in electronic communication with the processor 410 to receive data (e.g., image data) and provide output data (e.g., images). The display 430 may be a color display or a black and white display. In addition, the display 430 may be a two-dimensional display or a 3D display. In one embodiment, the display 430 may be capable of displaying multiple views.

Modifications, additions, or omissions may be made to SFSI 3D imaging device 10 or SFSI illumination device 100 without departing from the scope of the disclosure. In addition, the components of these devices may be integrated or separated according to particular needs. For example, the processor 410 or other suitable processor may be part of the SFSI illumination device 100. In some cases, the processor 410 may be integrated into the light detector 300 so that the light detector 300 performs the functions of the processor 410. As another example, the CRM 420 and/or display 430 may be omitted from the SFSI 3D imaging device 10 in certain cases. In some cases, the processor 410, CRM 420, and display 430 may be embodied in a computing device (e.g., tablet, smartphone, etc.).

Figure 2C:
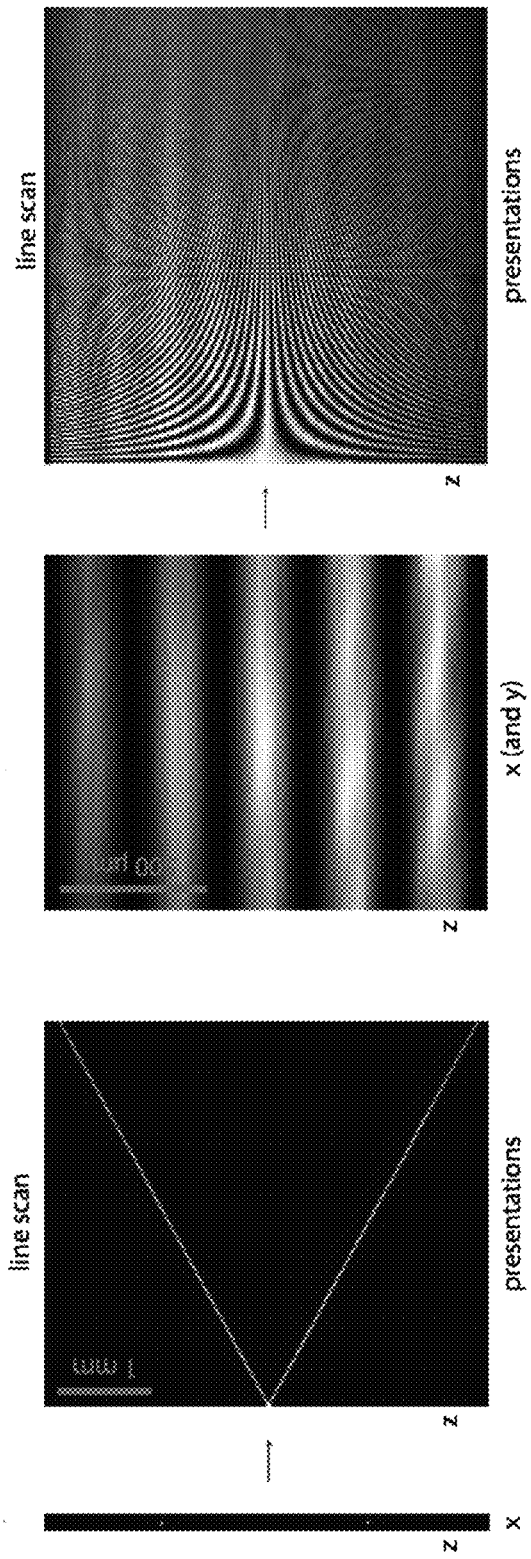
FIG. 2C shows example results from using an SFSI illumination device, according to an embodiment

FIG. 2C shows example results from using an SFSI illumination device 100 similar to the one shown in FIG. 2B, according to an embodiment. The left-most figure shows an example image of the Fourier plane. The next figure shows how the linear separation of the moving points 132 and 134 is increased in subsequent presentations. The third figure shows the corresponding grating at the sample plane and the right figure shows the changes in spatial frequency over time.

Propagation-Invariant Illumination

In certain aspects, the SFSI illumination device 100 can encode the axial position of sampled light data in the Fourier domain by providing propagation-invariant (or substantially invariant) illumination patterns at various frequencies at the sample plane. In some cases, these propagation-invariant illumination patterns that extend over several millimeters and robustly propagate through layers of varying refractive index. With these techniques, an SFSI illumination imaging device 10 of an embodiments can image a lateral field-of-view of 0.8 mm×1.5 mm with an axial resolution of 2.4 μm—greatly exceeding the lateral field-of-view of conventional illumination techniques (~100 μm) at comparable resolution. Thus, in certain embodiments, SFSI illumination imaging device 10 can surpass the limitations of diffracting illumination beams and untangle lateral field-of-view from resolution.

In conventional systems, beams focused through layers of varying refractive index (e.g. coverslips) can suffer from significant aberrations. In certain embodiments, the SFSI illumination device 100 can generate propagation-invariant illumination patterns that robustly propagate through layers of varying refractive index.

Figure 3A:
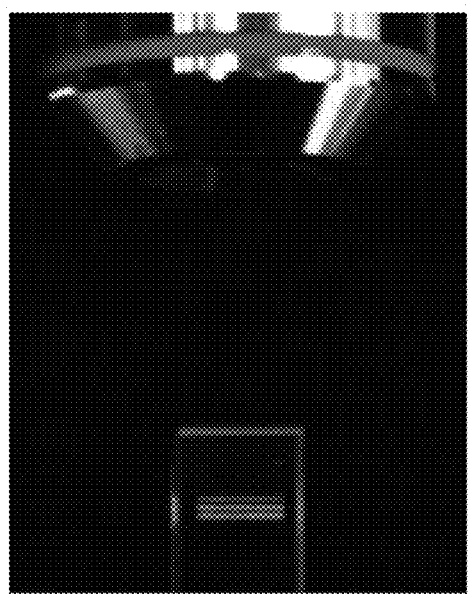
FIGS. 3A and 3B are photographs in the side view (x-z plane) of an illumination pattern at a sample plane of an SFSI illumination device, according to an embodiment.
Figure 3B:
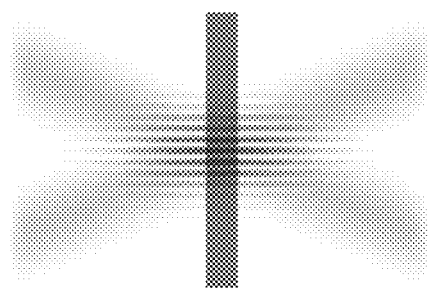

FIGS. 3A and 3B are photographs in the side view (x-z plane) of an illumination pattern at a sample plane of an SFSI illumination device 100, according to an embodiment. In these figures, the illumination pattern is illustrated illuminating a hydrogel inside a 5 mm wide cuvette through 1 mm thick glass wall. These figures show that the illumination sheets maintain their spatial frequency and remain parallel, even though they are projected from air, through quartz glass (n=1.46) into an aqueous solution (n=1.33).

This ability to robustly propagate through layers of varying refractive index can be confirmed mathematically. In certain cases, the period of the illumination pattern is a function of the half-angle α between the two beams:

$$\Delta z = \frac{\lambda}{2n\sin\alpha}.$$

With Snell's law of refraction, $\Delta z_{air}=$ $$\frac{\lambda}{2(n_{air} \cdot \sin\alpha_{air})} = \frac{\lambda}{2(n_{glass} \cdot \sin\alpha_{glass})} = \Delta z_{glass},$$

thereby confirming that the spacing between the sheets does not change upon entering a layer of different refractive index.

Figure 4A:
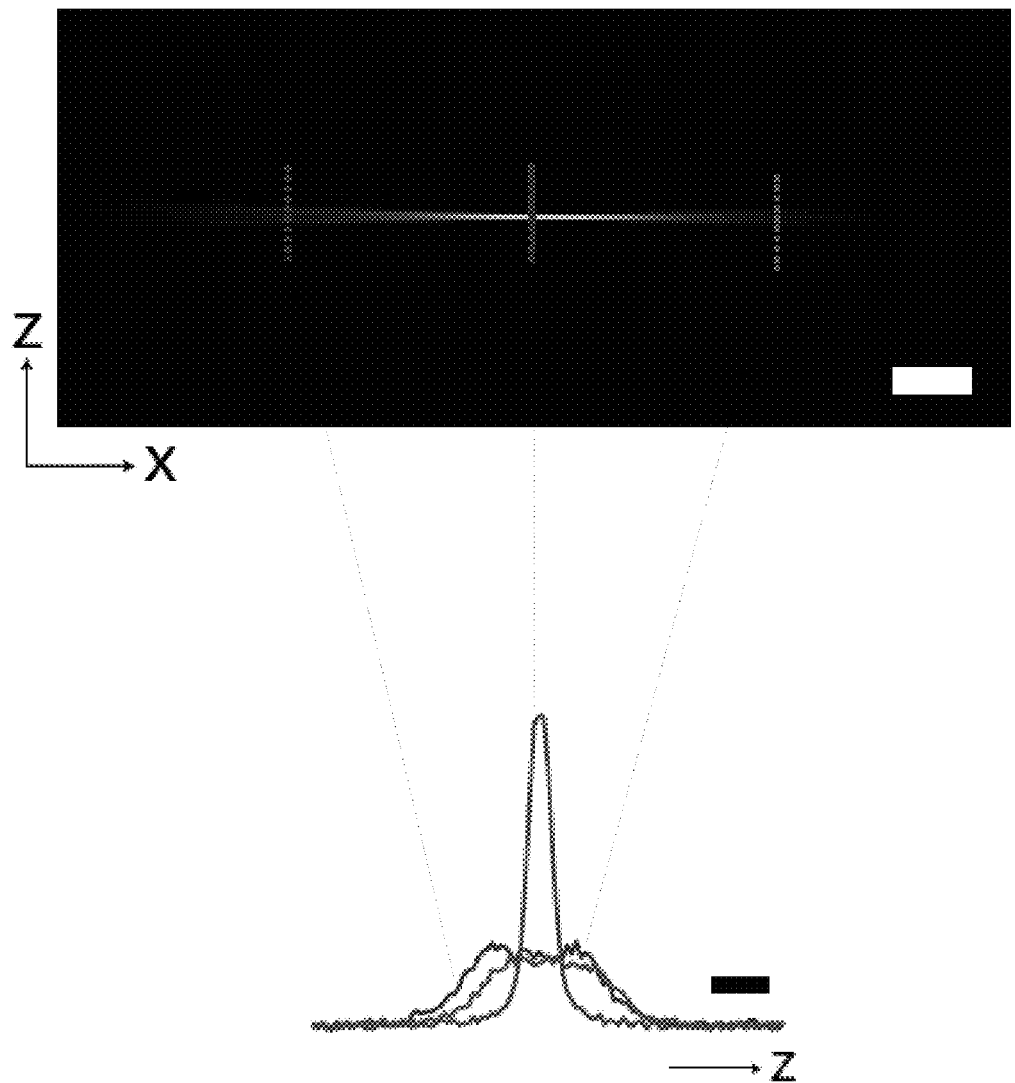
FIG. 4A is an illustration of illumination patterns from a conventional system.
Figure 4B:
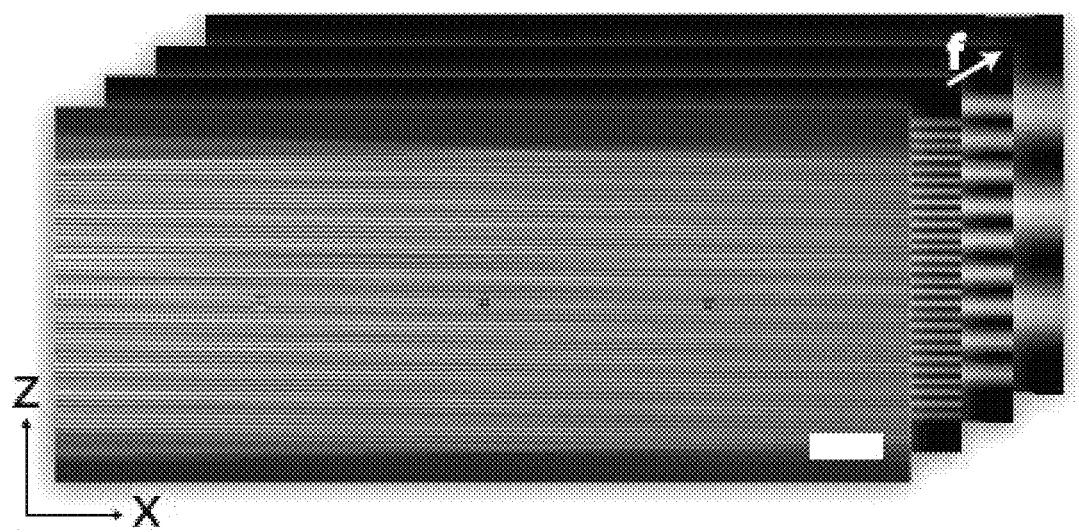
FIGS. 4B and 4C are illustrations of illumination patterns obtained by an SFSI illumination device, according to an embodiment.
Figure 4C:
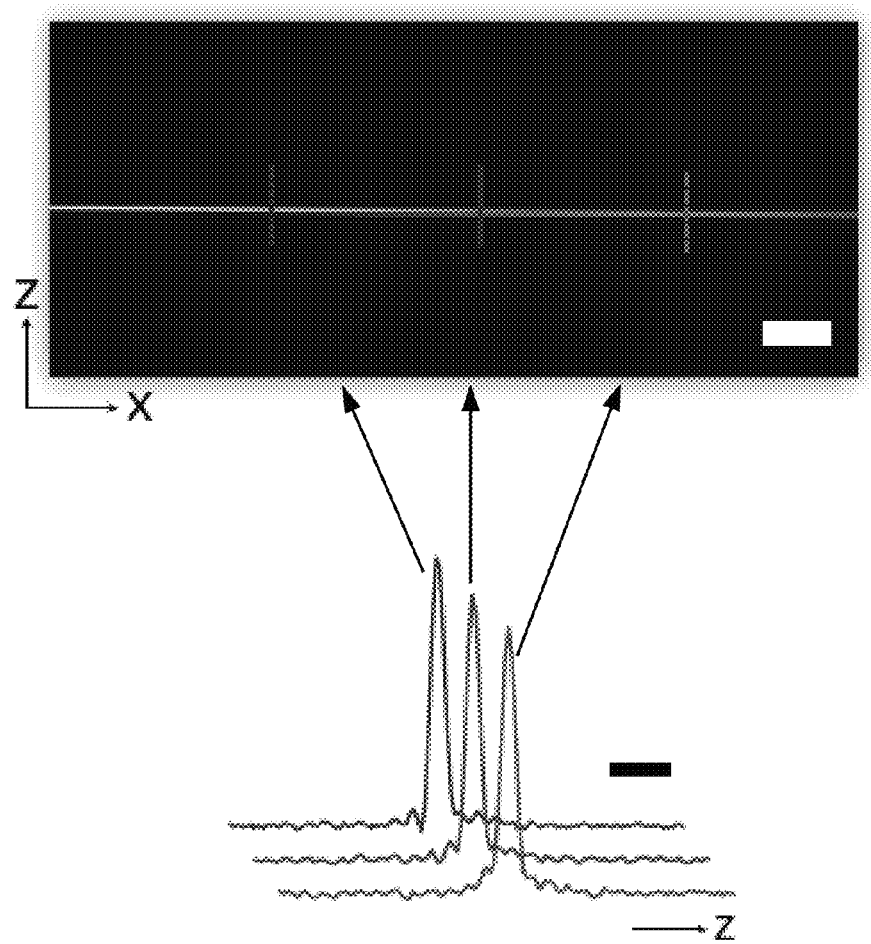

FIGS. 4A, 4B, and 4C are illustrations comparing the illumination patterns from a conventional system with a focused 0.1 Gaussian beam and an SFSI illumination device 100 of an embodiment. In these figures, the conventional system and the SFSI illumination device 100 of systems were used to illuminate an open top quartz-glass cuvette filled with fluorescent dye, fluorophore Rhod-6G dye. The cuvette was illuminated along the X-axis while monitoring illumination patterns in the x-y plane. To visualize the illumination pattern from the side in FIGS. 4A, 4B, and 4C, a 200 μm slit aperture was placed in front of the SLM 120 to restrict illumination to one x-z plane and separate detection optics were installed to image the illuminated x-z plane through the side of the glass cuvette.

FIG. 4A is an illustration of illumination patterns from a conventional system. The top illustration is a side-view (x-z plane) of the conventional system showing the focused 0.1 beam into the cuvette of the conventional system. The top illustration is a side-view (x-z plane) of the illumination. The bottom illustration is of z-axis profiles at different locations along the beam. As shown, the waist of the hourglass-shaped beam was thinnest at the focus and became thicker with further distance from the focus. If used for sectioning, the useable field-of-view along the x-axis would be on the order of 100 μm.

FIGS. 4B and 4C are illustrations of illumination patterns obtained by an SFSI illumination device, according to an embodiment, for comparison with FIG. 4A. FIG. 4B is an illustration of four stacked images of different illumination patterns with different spatial frequencies obtained by an SFSI illumination device, according to an embodiment. The top illustration in FIG. 4C is an illustration of the Fourier transform along the spatial frequency dimension of the dataset represented in the FIG. 4B. The bottom illustration in FIG. 4C is of the z-axis profiles at different locations. After displaying a full set of illumination frequencies ranging from 0 µm-1 to 0.25 µm-1 and Fourier transforming the dataset for each pixel, sharp peaks were obtained whose position depended on the pixel's position along the Z-axis (See FIG. 4C). Most notably, the sharpness of the peak did not depend on the position of the pixel along the x-axis.

Figure 5:
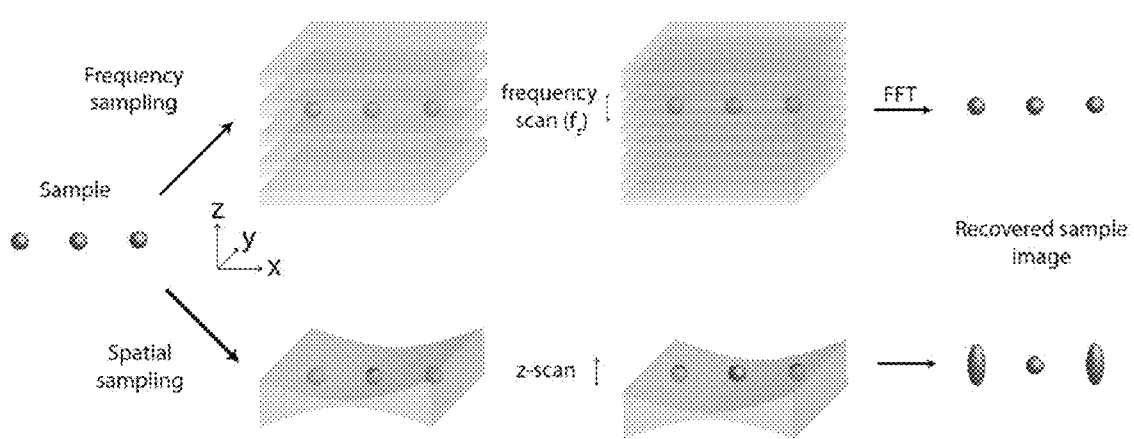
FIG. 5 are schematic illustrations showing the difference between spatial sampling with diffracting sheets of conventional systems and Fourier-domain sampling with propagation-invariant illumination of an SFSI illumination device of embodiments of the invention.

FIG. 5 are schematic illustrations showing the difference between spatial sampling with diffracting sheets of conventional systems and Fourier-domain sampling with propagation-invariant illumination of an SFSI illumination device 100 of embodiments of the invention.

Axial Resolution

In a fluorescence imaging embodiment, an SFSI 3D imaging device 10 with an SFSI illumination device 100 similar to the one shown in FIG. 2B 3D fluorescence images were taken of a 1 µm diameter agarose-embedded (e.g., with 1% Agarose) fluorescent beads in the X-Y plane. To visualize the illumination patterns in the X-Z plane, 0.1% saturated Rhod 6G in 1% Agarose hydrogel were used.

FIGS. 6A-6D are illustrated results from using an SFSI 3D imaging device 10 with an SFSI illumination device 100, according to an fluorescence imaging embodiment. In this fluorescence imaging embodiment, the SFSI illumination device 100 included an emission filter in the detection optics 200.

Figure 6A:
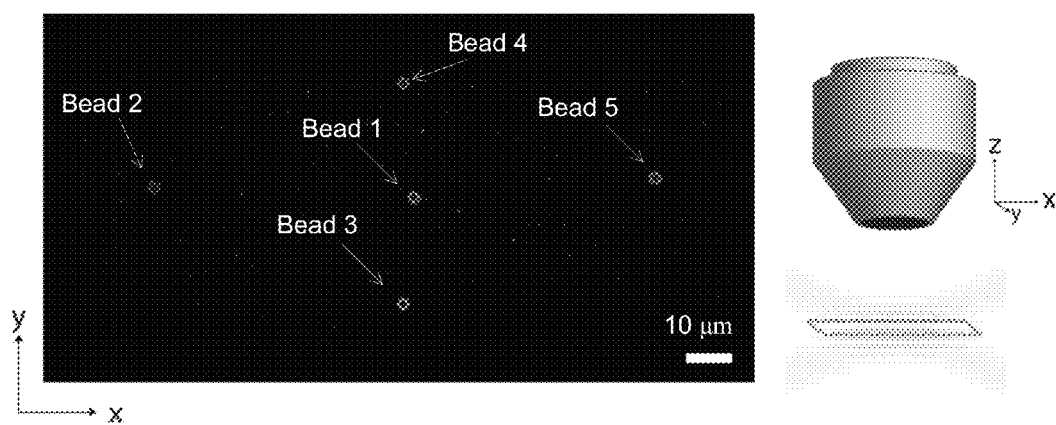
FIGS. 6A-6D are illustrated results from using an SFSI 3D imaging device 10 with an SFSI illumination device 100, according to an fluorescence imaging embodiment.

Using this SFSI 3D imaging device 10, images were taken of 1 µm diameter agarose-embedded fluorescent beads in the x-y plane to determine the axial resolution of the SFSI 3D imaging device 10. The left most image in FIG. 6A is a fluorescence image of the four 1 µm beads (0.8 mm×1.6 mm) (Bead 1, Bead 2, Bead 3, Beam 4, and Bead 5). The right most image of FIG. 6A is a schematic representation of components of the SFSI 3D imaging device 10 used.

Figure 6B:
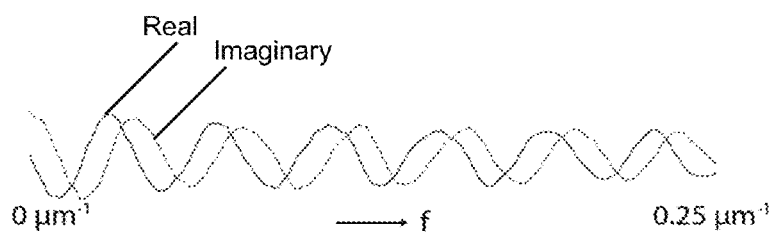
Figure 6C:
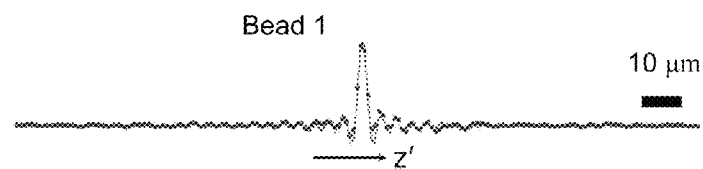
Figure 6D:
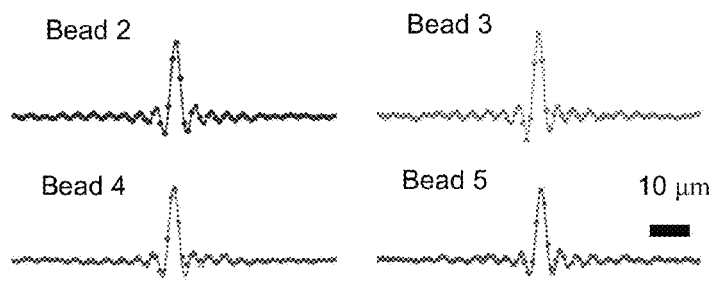

As the spatial frequency of the illumination patterns was swept from low to high in the imaging process, the fluorescence intensity of individual beads oscillated sinusoidally and the frequency of the oscillation depended on the location of the beads along the z-axis. FIG. 6B is a graph of the real and imaginary components of the complex dataset calculated from the fluorescence signal of Bead 1 as the spatial frequency of illumination sheets 110 was swept from 0 to 0.50 µm. Fourier-transforming the complex dataset resulted in peaks corresponding to the z-axis profiles of the beads. For example, Fourier transforming the signal in FIB. 6B resulted in the axial profile of the Bead 1 with a point—spread function approximated by a sinc-function (fit). FIG. 6C is a graph of the axial profile of the Bead 1. FIG. 6D are graphs of the axial profiles of Beads 2-5, illustrating uniformity of illumination across large field of view.

Given the uniform sampling of frequencies up to $f_{max}$, the profiles may be sinc functions. For example, when a sample is illuminated with the SFSI illumination device 100 described in FIG. 6B, with a plurality of illumination patterns up to a maximum spatial frequency $f_{max}$, of $$\frac{1}{4 \text{ µm}},$$

the measured FWHM of the peaks was measured to be 2.4 µm, which is close to a sinc FWHM of $0.6/f_{max}$ or $$\frac{0.3\lambda}{NA}.$$

As shown in FIG. 6D, the axial resolution in the SFSI 3D imaging device 10 of this example does depend on the bead's location within the illumination zone.

Using the SFSI 3D imaging device 10 of this fluorescence imaging embodiment, fluorescence images were taken of a starfish embryo to show its optical sectioning capability. The starfish embryos were fixed, permeabilized in ethanol, and stained with orange fluorescence dye (e.g., 5 µm SYTOX Orange) before they were embedded in hydrogel. The SFSI illumination device 100 illuminated the starfish embryo with a plurality of illumination patterns $$\left(\text{spatial frequency ranging from DC to } \frac{1}{4 \text{ µm}}\right).$$

Figure 7A:
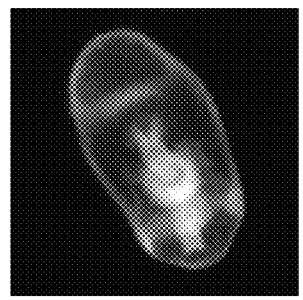
FIG. 7A is a fluorescence image of a starfish embryo.
Figure 7B:
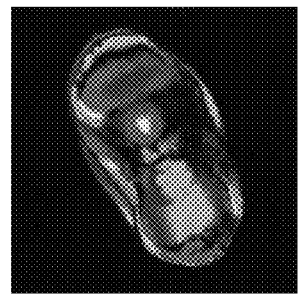
FIG. 7B is a complex image obtained for one of the illumination spatial frequencies, according to embodiments of the invention.
Figure 7C:
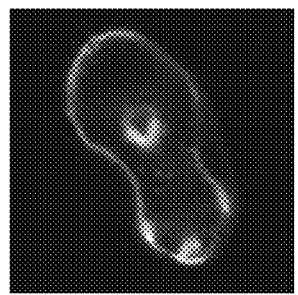
FIG. 7C and FIG. 7D are images of starfish embryo z-sections obtained by FFT using the SFSI imaging device 10, according to an embodiment of the invention.
Figure 7D:
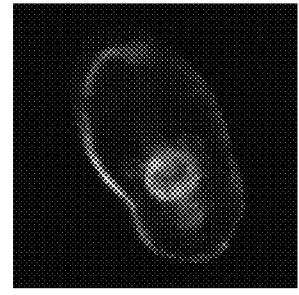
Figure 7E:
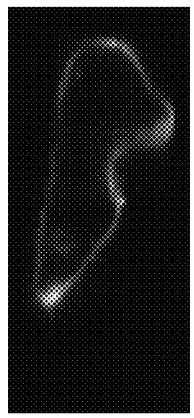
FIG. 7E is a side view of the same dataset in FIGS. 7C and 7D.
Figure 7F:
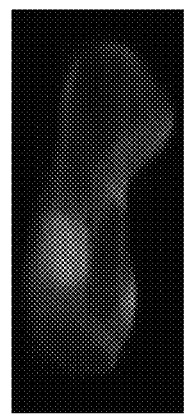
FIG. 7F is a projection along the x-axis of the same dataset in FIGS. 7C and 7D.
Figure 7G:
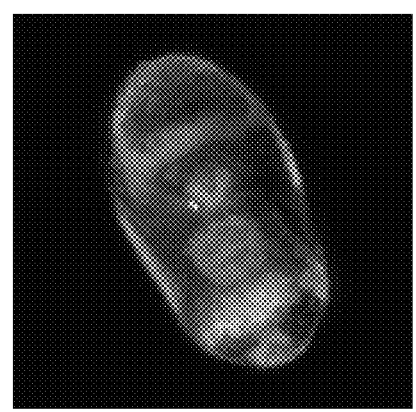

FIG. 7A is a fluorescence image of a starfish embryo. FIG. 7B is a complex image obtained for one of the illumination spatial frequencies, according to embodiments of the invention. The color of each pixel indicates the measurement phase, the luminance the amplitude. Fourier transforming the dataset yielded a stack of optical sections of the embryo. FIG. 7C and FIG. 7D are images of starfish embryo z-sections obtained by FFT using the SFSI imaging device 10, according to an embodiment of the invention. FIG. 7E is a side view of the same dataset in FIGS. 7C and 7D. FIG. 7F is a projection along the x-axis of the same dataset in FIGS. 7C and 7D. Because only Fourier components modulated by the illumination pattern were recorded, the SFSI 3D imaging device 10 automatically rejected any background illumination or DC offset of the light detector 300. This resulted in high-contrast sections, which were used for reconstruction of the starfish 3D structure. FIG. 7G is a 3D image resulting from the 3D reconstruction of the starfish 3D structure. In this example, the dataset was multiplied with a Gaussian along f (FWHM=2·$f_{max}$) before Fourier-transforming which increased the impulse-response FWHM from 2.4 µm to 2.8.

Exemplary SFSI Imaging Method and Illumination Method

Figure 8:
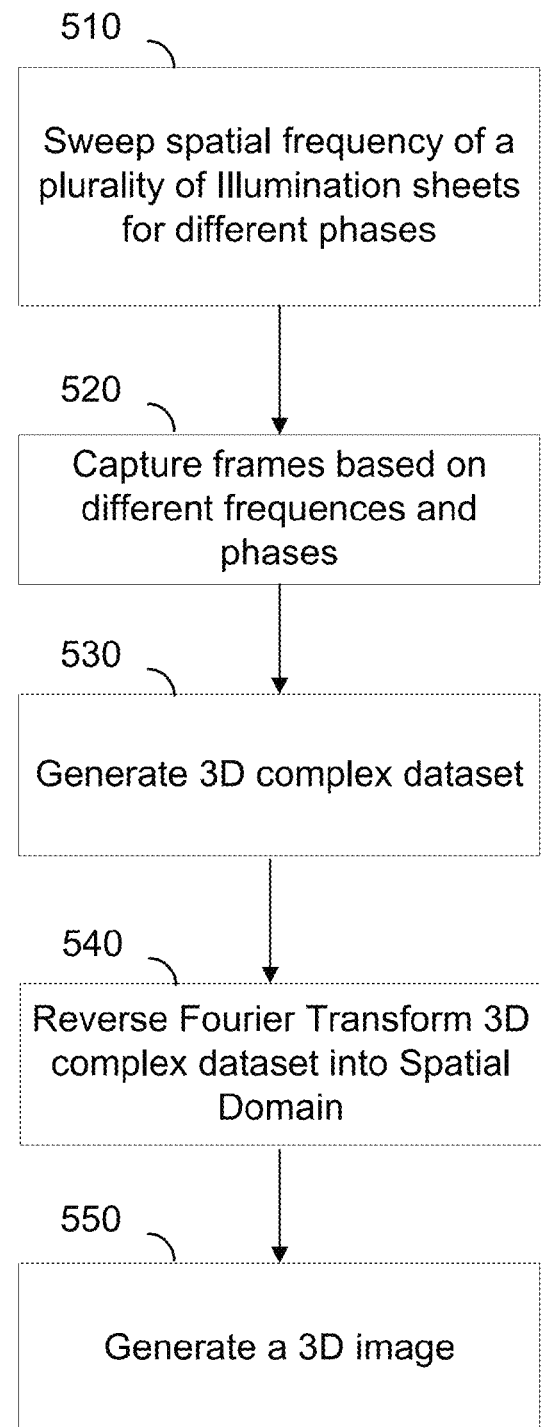
FIG. 8 is a flowchart of an exemplary SFSI imaging method that can be performed by an SFSI imaging device of various embodiments.

FIG. 8 is a flowchart of an exemplary SFSI imaging method that can be performed by an SFSI imaging device 10 of various embodiments. Step 510 of this exemplary method involves an exemplary SFSI illumination method.

At step 510, the SLM 120 sweeps the spatial frequency of the plurality of illumination sheets 110. The spatial frequencies may be displayed in discrete interfaces from zero to a maximum frequency $f_{max}$, according to $\Delta f=1/h$, where h is the demagnified height of the SLM display at the sample plane. Each spatial frequency is displayed for n different phases. In most cases, three phase shifts may be used. In exemplary embodiments, $\phi=0, \pi/2, \pi$ may be used. The SLM 120 sweeps spatial frequency by modifying the angle α of the intersecting collimated coherent beams 112. Changing the angle α of intersection of the collimated coherent beams 112 generates a sinusoidal illumination profile in the axial direction with varying spatial frequencies. The plurality of illumination sheets 112 can illuminate a sample at or near the sample plane.

At step 520, the light detector 300 captures light data based on light from the detection optics 200. In most cases, the light detector 300 captures m×n frames (m=phases; n=frequencies).

At step 530, the processor 4140 generates a 3D complex data set C(x,y,f) from the captured light data based on Eqn. 3. This complex-valued dataset C(x,y,f) may be zero-padded with an additional n−1 frames, made conjugate symmetric along f (by mirroring and conjugating the dataset along the zero frequency). In one case, the dataset may also be multiplied with a Gaussian along f (FWHM=2·$f_{max}$).

At step 540, the processor 410 back transforms the 3D complex data set into the spatial domain by discrete Fourier transform, yielding a reconstructed 3D sample function.

At step 550, the processor 410 determines a 3D image reconstructed 3D sample function.

Advantages

Embodiments of the invention may provide one or more technical advantages. For example, certain embodiments are SFSI illumination methods that provide propagation-invariant or nearly invariant illumination patterns that can encode the axial sample profile in the Fourier domain. Based on this illumination, the SFSI 3D imaging methods can efficiently disentangle axial resolution and lateral field of view.

As discussed, the SFSI illumination device 100 generates a plurality of parallel sheets 110 of varying spatial frequency as controlled by the spatial light modulator 120. In contrast to conventional imaging methods that employ a single planar sheet, the SFSI 3D imaging device 10 uses an interference pattern that extends over the entire intersection volume of the beams, e.g., several cubic millimeters. Generating a plurality of parallel sheets 110 means that multiple Z-planes of the sample can be illuminated simultaneously.

The SFSI imaging device 10 provides high consistently high axial resolution over a large field-of-view. This is accomplished by encoding the axial profile of the sample in the Fourier domain. This enabled us to bypass the limitations of conventional, diffracting illumination beams and disentangle axial resolution from lateral field-of-view. In certain embodiments, the illumination patterns have been demonstrated to extend over several mm² and have enabled axial resolution of up to 2.4 µm. In other embodiments, a higher NA illumination objective could be used to achieve a resolution limit of 0.3λ (better than the diffraction-limited resolution). All photons collected at the light detector 300 were used for the computation of the sections, and no photons needed to be rejected with a mask or discarded—avoiding excess sample illumination.

Conventional spectral-domain optical coherence tomography (SD-OCT) encodes the axial sample profile in the Fourier domain. Some examples of SD-OCT can be found in Fercher, A. F., Hitzenberger, C. K., Kamp, G. and El-Zaiat, S. Y., "Measurement of intraocular distances by backscattering spectral interferometry," *Optics Communications* 117, pp. 43-48 (1995), Wojtkowski, M., Leitgeb, R., Kowalczyk, A., Bajraszewski, T. and Fercher, A. F., "In vivo human retinal imaging by Fourier domain optical coherence tomography," *J Biomed Opt* 7, p. 457 (2002), Choma, M., Sarunic, M., Yang, C. and Izatt, J., "Sensitivity advantage of swept source and Fourier domain optical coherence tomography," *Opt Express* 11, pp. 2183-2189 (2003), and Dowski, E. R. and Cathey, W. T., "Extended depth of field through wave-front coding," *Appl Opt* 34, pp. 1859-1866 (1995), which are hereby incorporated by reference in their entirety. In SD-OCT however, the axial sample profile is encoded in the spectral Fourier space. Whereas, SFSI imaging techniques encode in spatial Fourier space. The main difference between SD-OCT and SFSI, in terms of their applications, is that SD-OCT cannot be used for fluorescence imaging, while SFSI is well-suited for this task.

The depth-of-field (DOF) at which the lateral (xy) resolution is highest may depend on the NA of the detection objective lens in the detection optics 200 of embodiments. For typical large field-of-view, low magnification microscope objectives, it can be in the range of a few 100 µm (NA 0.1-0.2). Use of a higher magnification, higher NA detection objective may be desirable as long as its lateral field-of-view is sufficient for the task. Objects taller than the DOF could then be imaged by mechanically moving the sample and tiling. In order to achieve higher DOF without tiling or mechanical motion, an SFSI technique of an embodiment may employ focus-free imaging approaches in the detection path, such as wavefront coding with cubic phase plates and light-field imaging techniques. Some examples of these techniques can be found in Dowski, E. R. and Cathey, W. T., "Extended depth of field through wave-front coding," *Appl Opt* 34, pp. 1859-1866 (1995), Cathey, W. T. and Dowski, E. R., "New paradigm for imaging systems," *Appl Opt* 41, pp. 6080-6092 (2002), and Levoy, M., Ng, R., Adams, A., Footer, M. and Horowitz, M. "Light field microscopy,"*Acm T Graphic* 25, pp. 924-934 (2006), which are hereby incorporated by reference in their entirety.

Figure 9:
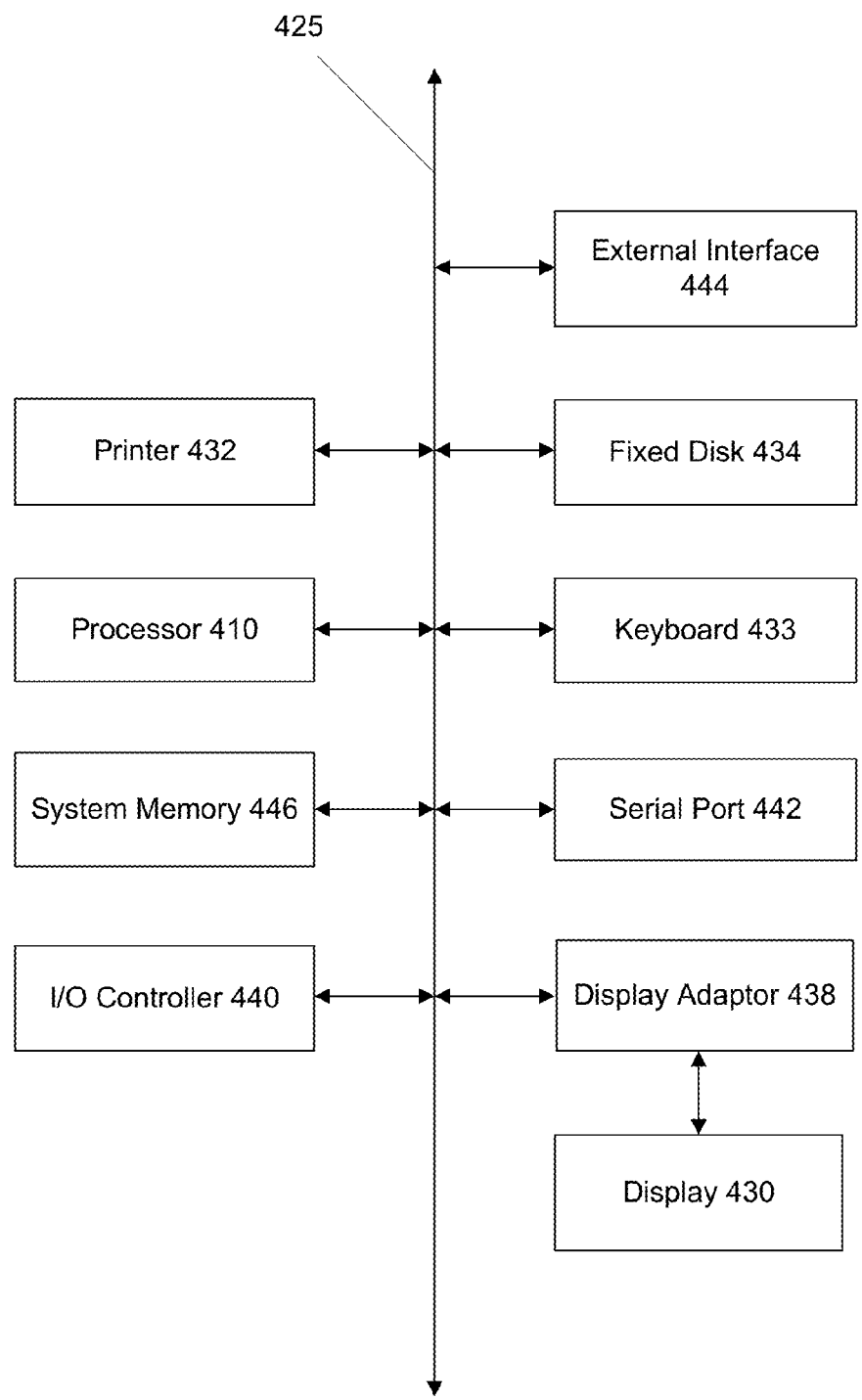
FIG. 9 is a block diagram of subsystems that may be present in a SFSI 3D imaging device, according to embodiments.

FIG. 9 is a block diagram of subsystems that may be present in a SFSI 3D imaging device 10, according to embodiments. For example, the SFSI 3D imaging device 10 includes a processor 410. The processor 410 may be a component of the SFSI 3D imaging device 10 in some cases. The processor 410 may be a component of the radiation detector 140 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 9. The subsystems shown in FIG. 9 are interconnected via a system bus 425. Additional subsystems such as a printer 432, keyboard 433, fixed disk 434 (or other memory comprising computer readable media), display 430, which is coupled to display adapter 438, and others are shown. Peripherals and input/output (I/O) devices, which couple to I/O controller 440, can be connected by any number of means known in the art, such as serial port 442. For example, serial port 442 or external interface 444 can be used to connect processor 410 to a wide area network such as the Internet, a mouse input device, or a scanner. The interconnection via system bus 425 allows the processor 410 to communicate with each subsystem and to control the execution of instructions from system memory 446 or the fixed disk 434, as well as the exchange of information between subsystems. The system memory 446 and/or the fixed disk 434 may embody the CRM 420 in some cases. Any of these elements may be present in the previously described features.

In some embodiments, an output device such as the printer 432 or display 430 of the SFSI 3D imaging device 10 can output various forms of data. For example, the SFSI 3D imaging device 10 can output 2D color/monochromatic images (intensity and/or phase), data associated with these images, or other data associated with analyses performed by the SFSI 3D imaging device 10.

Modifications, additions, or omissions may be made to any of the above-described SFSI 3D imaging methods, SFIS illumination methods, SFSI 3D imaging devices, and SFSI illumination devices and their associated features without departing from the scope of the disclosure. For example, in one embodiment, an SFSI illumination device 100 may employ other scanning strategies, such as galvanometer, instead of the SLM 120. In these embodiments, the other scanning strategies maintain precise control over phase and angle of the interfering illumination beams 112. As another example, the SFSI 3D imaging methods SFSI illumination methods described above may include more, fewer, or other features without departing from the scope of the disclosure. Additionally, the steps of the described features may be performed in any suitable order without departing from the scope of the disclosure.

In certain embodiments, the SFSI 3D imaging devices and associated methods are designed to be used for imaging based on detected fluorescence or phosphorescence emissions. In a different embodiment, an SFSI 3D imaging device can be configured for imaging based on light scattered by the sample. In this embodiment, the SFSI 3D imaging device may detect light scattered laterally (side scatter) by the sample. In this embodiment, the SFSI 3D imaging device does not have an emission filter to reject excitation light. Instead, the light detector detects the excitation light passing through the objective lens that is scattered by the sample.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A spatial frequency swept interference illumination device, comprising,
    a spatial light modulator for displaying two interlaced diffraction patterns; and
    an optical system for transforming the displayed interlaced diffraction patterns into a plurality of illumination sheets with sweeping spatial frequency.

2. The spatial frequency swept interference illumination device of claim 1, wherein the optical system comprises:
    a first lens for projecting two moving spots to a Fourier plane, each moving spot based on one of the two interlaced diffraction patterns; and
    a second lens for reverse Fourier transforming the two spots into two intersecting collimated coherent beams providing an interference pattern of a plurality of illumination sheets with varying spatial frequency.

3. The spatial frequency swept interference illumination device of claim 2, wherein the optical system is a 4-f system.

4. The spatial frequency swept interference illumination device of claim 2, further comprising a slit aperture at the Fourier plane.

5. The spatial frequency swept interference illumination device of claim 1, wherein the optical system transforms the displayed interlaced diffraction patterns into two intersecting collimated coherent beams providing an interference pattern comprising the plurality of illumination sheets with varying spatial frequency.

6. The spatial frequency swept interference illumination device of claim 5, wherein the spatial light modulator is also for modifying a relative phase of the intersecting collimated coherent beams.

7. The spatial frequency swept interference illumination device of claim 1, wherein each of the interlaced diffraction patterns is a blazed grating.

8. A method of spatial frequency swept interference illumination, comprising:
    sweeping spatial frequency of a plurality of illumination sheets from an interference pattern generated by two intersecting collimated coherent beams; and
    changing a relative phase of the two intersecting collimated coherent beams to two or more different phases.

9. The method of spatial frequency swept interference illumination of claim 8, further comprising:
    capturing frames of a sample illuminated by the plurality of illumination sheets at different relative phases;
    generating a 3D complex dataset based on the captured frames based on different relative phases; and
    reverse Fourier transforming the 3D complex dataset into a spatial domain to generate a 3D image of the sample.

10. The method of spatial frequency swept interference illumination of claim 8, further comprising capturing frames of a sample illuminated by the plurality of illumination sheets at different relative phases.

11. The method of spatial frequency swept interference illumination of claim 10, further comprising:
    generating a complex dataset based on the captured frames based on different relative phases; and
    reverse Fourier transforming the complex dataset into a spatial domain to generate an image of the sample.

* * * * *